United States Patent

[11] 3,583,169

| [72] | Inventor | George W. Morgan<br>Anaheim, Calif. |
|---|---|---|
| [21] | Appl. No. | 839,992 |
| [22] | Filed | July 8, 1969 |
| [45] | Patented | June 8, 1971 |
| [73] | Assignee | North American Rockwell Corporation |

[54] SUBMARINE PIPELINE LAYING
10 Claims, 10 Drawing Figs.

[52] U.S. Cl. .................................................. 61/72.3
[51] Int. Cl. .................................................. F16l 1/00, B63b 35/04
[50] Field of Search ........................................ 61/72.3, 72.4, 72.1

[56] References Cited
UNITED STATES PATENTS

| 3,136,133 | 6/1964 | Perret ......................... | 61/72.3 |
| 3,479,831 | 11/1969 | Teague, Jr. ..................... | 61/72.3 |

FOREIGN PATENTS

| 934,151 | 1963 | Great Britain ................. | 61/72.3 |
| 942,218 | 1963 | Great Britain ................. | 61/72.3 |

OTHER REFERENCES 1,217,149, German Printed Application to Bore et al., May, 1966, 61-72.3

Primary Examiner—Jacob Shapiro
Attorneys—William R. Lane and Allan Rothenberg

ABSTRACT: A method and apparatus are described for laying pipelines or the like on the bottom where the degree of bending in the line at all points between a lay barge and the bottom are controlled. The line is paid out of the barge in a horizontal direction with positive buoyancy at the surface. Means are provided for gradually decreasing the positive buoyancy of the pipeline as a function of distance aft of the barge until the line is neutrally buoyant and then gradually increasing negative buoyancy of the line as a function of distance until the line is near the bottom. A plurality of buoyancy controlling elements within the pipeline and attached to the barge by means of a cable is employed for gradually changing buoyancy.

INVENTOR.
GEORGE W. MORGAN

BY *Allan Rothenberg*

ATTORNEY

INVENTOR.
GEORGE W. MORGAN

BY
Allan Rothenberg
ATTORNEY

3,583,169

SUBMARINE PIPELINE LAYING

BACKGROUND

The laying of submarine pipelines along the ocean floor and in similar bodies of water has become a relatively commonplace operation any many techniques have been proposed and employed for laying pipelines. As in most submarine activities solutions are available for relatively shallow water, however, in deep water significant problems are encountered. In submarine pipeline installation the most critical factor in the operation is control of stresses in the pipeline as it travels from the pipeline lay barge to the ocean floor. The stresses in the pipeline are functions of the elastic curvature permitted to develop in the pipeline. As the water depths increase the significance of bending control increases.

The current state of the art may employ any of three broad techniques for laying submarine pipelines. In the first of these pipeline is payed out from the lay barge in a substantially vertical direction with a gradual curve near the sea floor to make the transition from a vertical orientation to the horizontal orientation of the pipeline on the sea floor. Such a technique is exemplified in U.S. Pat. No. 3,214,921 wherein a plurality of buoyancy chambers are attached to the pipeline as it makes its curved transition from a vertical to a horizontal position. In a variation of this technique the pipeline is payed out from the lay barge at an angle from the vertical so that a lesser curvature is required near the bottom. This approach is exemplified by U.S. Pat. No. 3,266,256. In the third state of the art technique, the pipeline is payed out from the lay barge in a horizontal direction and then follows a gentle S curve to a final horizontal position on the sea floor. Such a technique is exemplified in U.S. Pat. Nos. 3,331,212; 3,273,346; and 3,262,275.

In these patents it is well recognized that control of the curvature is required in order to prevent damage to the pipeline as it is layed. Thus, for example, in the aforementioned U.S. Pat. No. 3,262,275 buoys are secured to the pipeline as it is layed and the buoys are drawn down toward the bottom by the pipeline as it sinks. As each successive buoy reaches one-half the water depth it is released to float free from the pipeline thereby effecting an incremental and discontinuous change in buoyancy at regular pipe length intervals at one-half the water depth. With this arrangement for forces are uniform along the length of the pipeline in two separate regions with a discontinuity of force therebetween, and the shape of the pipeline will follow a first catenary from the lay barge to one-half the water depth and another catenary from one-half the water depth to the bottom.

In the aforementioned U.S. Pat. No. 3,273,346 another technique for bending control is provided by means of an elongated "stinger" connected to the ship and through which the pipeline passes. The stinger supports the negatively buoyant pipeline for a substantial depth below the lay barge and thereby controls its curvature and then the pipeline follows a free catenary from the end of the stinger to the ocean floor. In laying pipelines in extremely deep water the stinger technique is not suitable since it becomes of undue length and subject to extreme stresses itself, particularly in rough weather. Likewise, the deployment of a pipeline in either a single or double simple catenary shape at great depths impractical because of the weight of pipeline involved and hence the significant stresses developed in the pipe.

SUMMARY OF THE INVENTION

Therefore there is provided in practice of this invention according to a preferred embodiment method and means for laying a pipeline or the like on the sea floor by gradually decreasing positive buoyancy of the line as a function of distance from the lay barge and then gradually increasing negative buoyancy of the line as a function of distance through buoyancy control to bring the line to a horizontal position on the sea floor with a minimum curvature and stress on the line.

DRAWINGS

Objects and many of the attendant advantages of this invention will be readily appreciated as the same becomes better understood by reference to the following detailed description when considered in connection with the accompanying drawings wherein.

Throughout the drawings like reference numerals are employed on like parts.

DESCRIPTION

Figure 1:
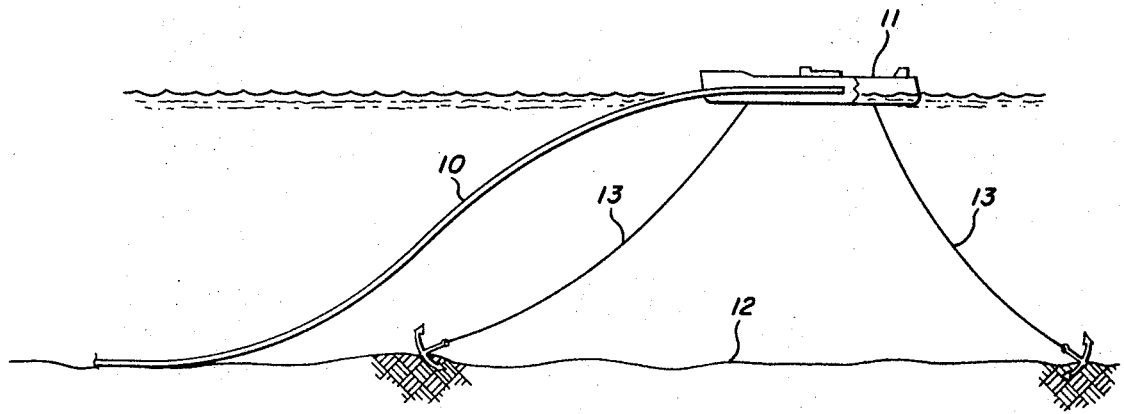
FIG. 1 illustrates in elevation the general arrangement involved in laying a pipeline on the ocean floor in practice of this invention.
Figure 2:
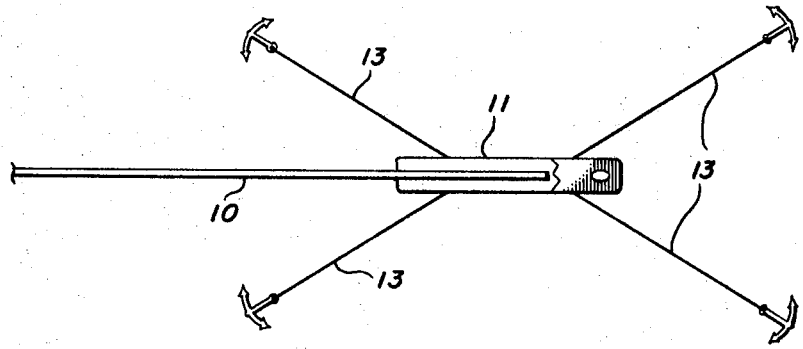
FIG. 2 is a plan view of the view of FIG. 1.

FIGS. 1 and 2 illustrate in elevation and plan, respectively, the laying of a pipeline according to the principles of this invention. As illustrated in this embodiment, a pipeline 10 or similar elongated structure is payed out from a conventional lay barge 11 so as to be substantially horizontal as it leaves the barge and enters the water. The pipeline 10 then follows a long gentle S curve between its horizontal position at the lay barge 11 and a horizontal position along the sea floor 12. The starting of the line is conventional and may be a technique as in the aforementioned patents and does not form a portion of this invention.

Thus, for example, a Variable Angle Lay Barge such as described in copending U.S. Pat. application Ser. No. 717,492 by George W. Morgan and J. D. Lamb and assigned to North American Rockwell Corporation, assignee of this invention may be employed to lower the end of the line vertically to the bottom and then gradually move along the path of the pipeline with the pipeline at the barge approaching the horizontal. If desired the initial portion of the pipeline can be of thicker wall or otherwise reinforced to accept greater stresses.

The lay barge 11 may also be other types of conventional barge or ship such as employed for pipeline laying. Conventional onboard pipeline handling equipment may be employed or modifications made for connecting structures hereinafter described and illustrated. The lay barge 11 may be self-propelled, driven by tugs, or may employ a plurality of anchor lines 13 for steadying the barge during the pipeline laying operation and kedging the barge along the path of the pipeline. The moored technique of moving the barge may be preferred in order to minimize uncontrolled motion thereof and thereby minimize undue dynamic stresses on the pipeline during laying.

Figure 3:
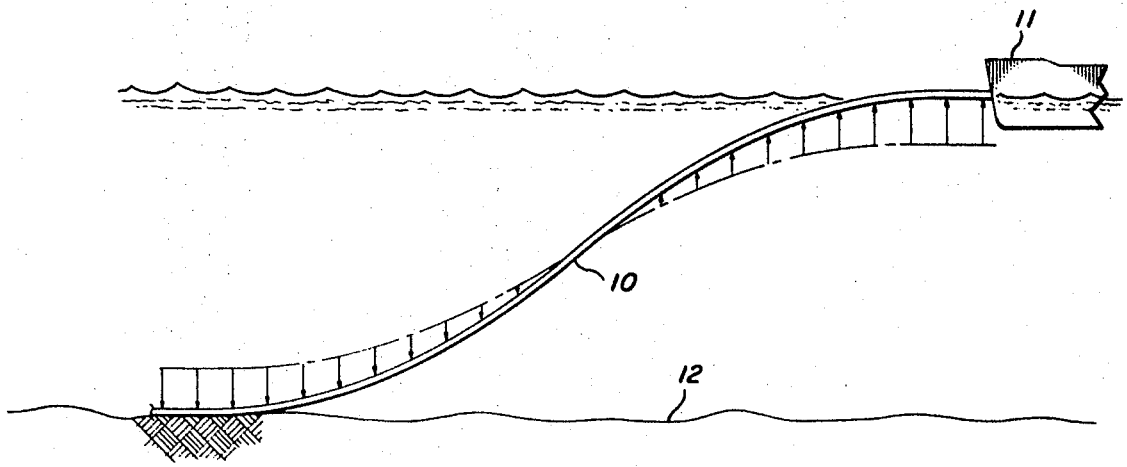
FIG. 3 illustrates schematically the variation in buoyancy provided in a pipeline between the sea surface and the sea floor.

By properly distributing the forces directed upwardly and downwardly on the pipeline a gentle S curve of minimum curvature as illustrated in FIG. 1 can be readily provided. The magnitude of curvature at any point along the S curve is varied by selecting the rate of change of force along the length. Thus, as illustrated schematically in FIG. 3 forces on the pipeline are directed upwardly as a positive buoyancy near the water surface and there is a gradual and continuous progressive decrease in positive buoyancy as the pipeline proceeds deeper in the water and further aft of the lay barge. The inflection of the S curve of the pipeline corresponds approximately to the point where the decrease in buoyancy has reached zero; that is, the pipeline is substantially neutrally buoyant. Thereafter, proceeding along the length of the pipeline from the lay barge, the negative buoyancy tending to make a pipeline sink is gradually and continuously increased as a function of distance until the pipeline is resting in a horizontal position on the sea floor. The magnitude of positive buoyancy +B is indicated schematically by the length and direction of the arrows along the pipeline and the magnitude of the negative buoyancy −B is indicated by the length and direction of the arrows on the pipeline near the bottom.

Figure 4:
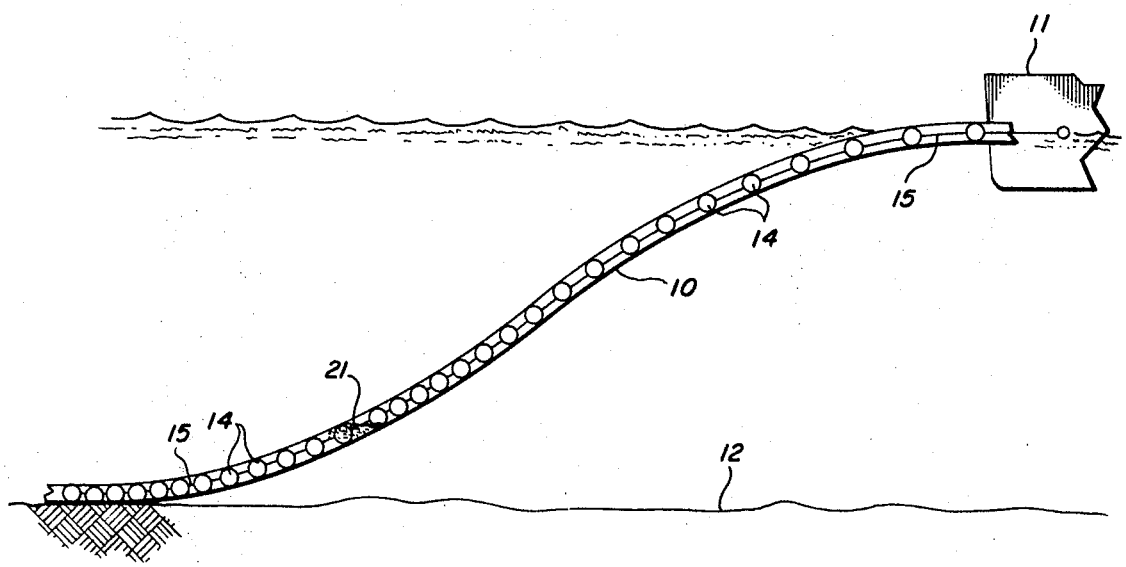
FIG. 4 illustrates a preferred technique for varying buoyancy with a plurality of weights within a positively buoyant pipeline.

In order to achieve a gradual change in the buoyancy of the pipeline between the lay barge and the bottom in a substantially continuous manner substantially all of the way from the lay barge to the bottom a technique as illustrated in FIG. 4 may be employed. As illustrated in this embodiment which employs a greatly exaggerated diameter of pipeline in section for purposes of illustration, the pipeline is deployed horizontally from the aft end of the lay barge 11 and follows a gentle S curve until resting on the sea floor 12. The pipeline 10 is positively buoyant, either because of air trapped therein or because of external buoyant bodies or material secured reasonably uniformly along its length. In this condition the pipeline would float on the water surface. In order to make the pipeline sink a plurality of weights 14 are arranged within the pipeline and the weights are interconnected by a cable 15 extending along the length of the pipeline and fastened to the lay barge as hereinafter described in greater detail.

In order to effect a gradual change in the buoyancy of the pipeline the weight distribution within the pipeline is varied along the length. In the illustrated embodiment the weights 14 within the pipeline are of substantially uniform mass and the space between the weights is gradually decreased as a function of distance to effect a gradual decrease in the positive buoyancy of the pipeline as a function of distance aft of the lay barge. It will be apparent that as the weights become closer and closer together the positive buoyancy +B progressively decreases until a segment of the pipeline is substantially neutrally buoyant and then as additional weights are spaced along the pipeline the negative buoyancy −B gradually and progressively increases as a function of length of the pipeline. It will be apparent that for purposes of illustration in FIG. 4 only a few relatively widely spaced weights are illustrated and that in an actual application a much larger number of weights would be employed with the number and spacing of weights determined by pipeline size, buoyancy, water depth, and allowable pipeline curvature. It will also be apparent that the weights may be evenly spaced along the cable and of gradually increasing mass to obtain the same result.

As the pipeline is layed from the barge the pipeline already on the bottom is fixed in position and hence the pipeline between the bottom and the barge can move only in a substantially vertical direction. In order to lay out additional pipeline the lay barge is moved along the path of the pipeline and additional length is layed overboard in a conventional manner. The cable 15 in this embodiment is connected to the lay barge so that it and the weights 14 attached thereto move along with the barge along the length of the pipeline. Thus the continuously variable weight distribution is progressively moved along the pipeline as it is payed out from the lay barge. The rate of change and magnitude of the weight moving along the length of the pipeline will vary over broad ranges depending on the water depth and pipeline diameter and wall thickness. These can readily be varied to provide any desired allowable curvature and stress in the pipeline.

Figure 5A:
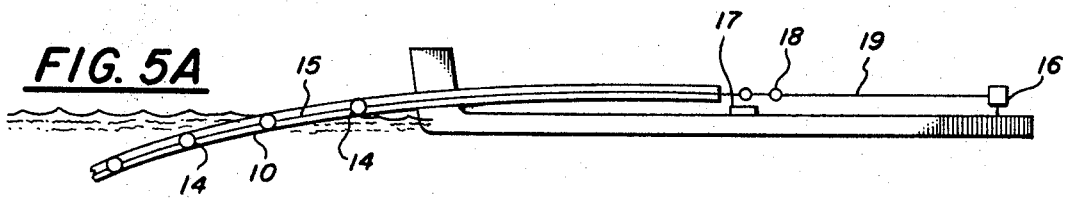
FIGS. 5A to 5E illustrate steps in handling the pipeline aboard the lay barge.

FIGS. 5A through 5E illustrate a technique for connecting the cable 15 to the lay barge 11 and substantially continuously laying pipeline with the cable therein. As illustrated in FIG. 5A the end of the pipeline 10 goes overboard from the lay barge at the aft end and also extends horizontally forwardly along the barge for a substantial length. The cable 15 which is within the pipeline proceeds substantially further along the lay barge and is permanently connected thereto at a conventional cable connector 16.

Figure 5B:
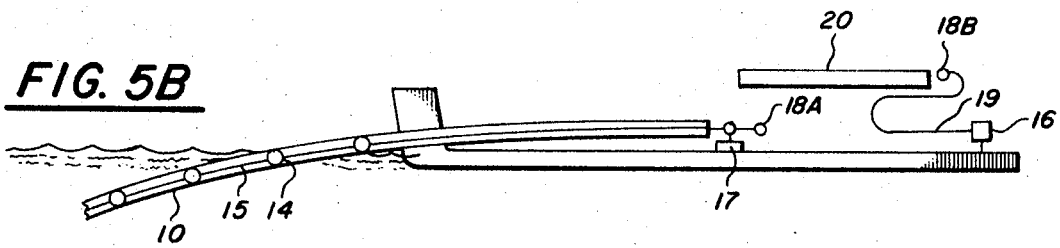
Figure 5C:
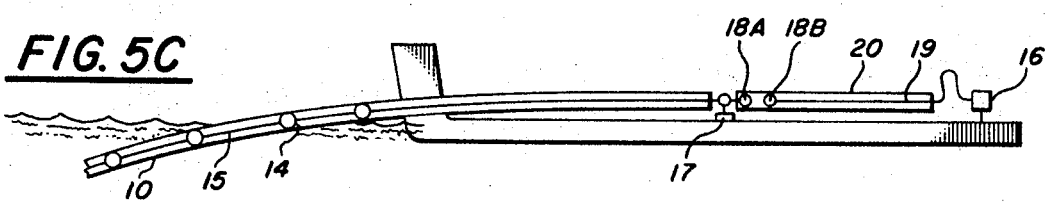

When the open end of the pipeline has reached a point as illustrated in FIG. 5A and 5B the cable 15 is temporarily connected to the barge at a connector 17 as illustrated in FIG. 5B. The two halves of a conventional quick disconnect 18 in the cable are then separated and a length of cable 19 between the permanent cable connector 16 and the quick disconnect is loosened at the end nearest the temporary connector 17 (or at the opposite end if more convenient). The short intermediate length of cable 19 is then threaded through a new segment of pipeline 20 onboard the lay barge as illustrated in FIG. 5C. When the cable is threaded through the new length of pipe 20 the quick disconnect 18 is reconnected and the temporary connector 17 released so that the cable 15 is free and continuous from the cable connector 16 to the furthest weight 14 at the opposite end of the cable 15.

Figure 5D:
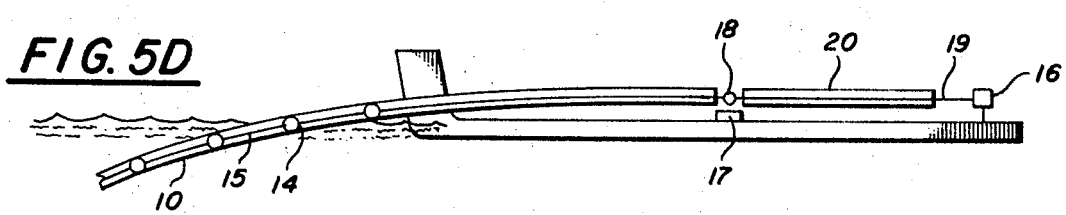
Figure 5E:
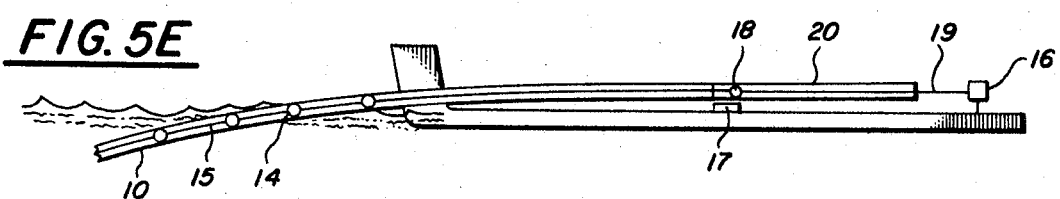

The new section of pipe 20 is then advanced to the open end of the pipeline as illustrated in FIG. 5D and welded to the end of the pipeline 10. In addition to welding stations on the lay barge for connecting new sections of pipe, stations may be employed for applying protective coatings and inspecting the pipeline as desired. It will also be apparent that "flying" welding, coating, and inspection stations may be employed to move along the lay barge with the pipeline as it is put overboard so that the barge may move steadily instead of stopping each time a segment of pipe 20 is added to the pipeline.

In addition to the weights 15 in the lower end of the pipeline 10 as it approaches the ocean floor water 21 may be added inside the pipeline so that the weight required on the cable 15 is reduced. In order to add water to the pipeline it is preferred to allow water to pass along the length of the pipeline from the lay barge to displace the air therein and keep the lowermost segment filled with water. Any conventional water level sensor (not shown) may be connected to the cable 15 at the desired water level for control of the means for adding water from onboard the lay barge. This point of addition of water is preferred since better control is provided onboard the lay barge as compared with controlled addition of water from the opposite end of the pipeline.

Figure 6:
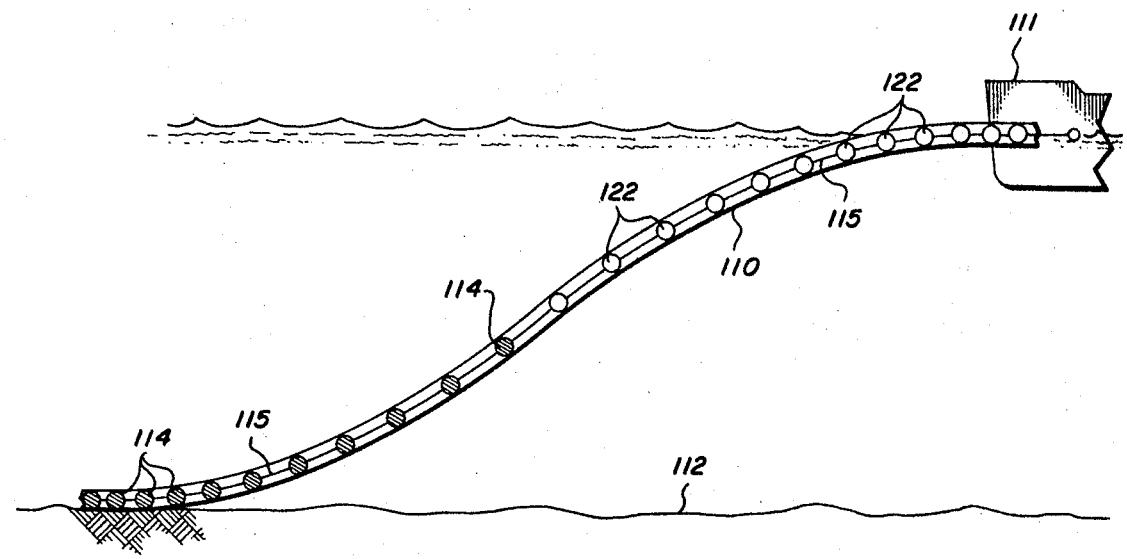
FIG. 6 illustrates an alternative technique to that illustrated in FIG. 4.

FIG. 6 illustrates another technique for gradually decreasing the positive buoyancy of a pipeline and increasing the negative buoyancy as a function of length during laying of the pipeline on the ocean floor. In this embodiment a pipeline 110 filled with water is payed out from a lay barge 111 in a horizontal direction so as to follow a gentle S curve between the water surface and the sea floor 112. Within the pipeline 110 there is provided a continuous cable 115 which is connected to the lay barge 111 as hereinabove described. Attached to the cable 115 at its upper end nearer the lay barge are a plurality of buoyant bodies 122 which displace water within the pipeline and make the pipeline positively buoyant. The spacing between buoyant bodies 122 gradually increases as a function of distance aft of the lay barge 111. After progressing a sufficient distance aft of the lay barge the reducing positive buoyancy of the pipeline reaches neutral buoyancy and a gradually increasing negative buoyancy is provided with increasing water depth and increasing distance from the lay barge. In order to provide increasing negative buoyancy, weights 114 may be spaced along the cable as hereinabove described.

It will also be apparent to one skilled in the art that the means for gradually decreasing positive buoyancy and increasing negative buoyancy as a function of length may be provided on the exterior of the pipeline rather than the interior. Provision on the interior is preferred, however, since this is smoother and more rugged than the exterior of the pipeline with its connections and organic protective coatings. This is of significance since the weights or other means for changing the buoyancy progress along the pipeline as it is laid on the bottom. Pulling the weights through the interior of the pipeline is also preferred in those cases where the volume of pipeline is insufficient to provide positive buoyancy when the line is merely filled with air, since in that situation a uniform distribution of buoyant material or buoyant bodies is provided on the exterior of the pipeline along its length. These buoyant bodies would interfere with movement of weights along the length of the pipeline. If desired, closely spaced buoyant bodies along the length of the pipeline can be progressively released to float the surface at a selected distance above the bottom so that the size or spacing of the weights within the pipeline can be decreased in the same manner provided by water flooding as hereinabove described. Generally, however, it is preferred if buoyant bodies are employed to leave them attached to the pipeline until the pipeline is resting on the bottom so that certainty in gradual change in stress and curvature control is obtained.

Obviously many other modifications and variations of the present invention are possible in light of the above teachings. Thus, for example, instead of using discrete weights deployed along a cable, a flexible member of gradually increasing unit mass such as a chain with gradually increasing link size could be employed. Other modifications in variations will readily suggest themselves to one skilled in the art.

I claim:

1. A method of laying a submarine pipeline comprising:
   paying a positively buoyant pipeline overboard from a floating vessel in a substantially horizontal direction:
   placing an elongated member having nonuniformly distributed weight within said pipeline in the segment between said floating vessel and the sea floor;
   fixing said elongated member to said floating vessel; and
   moving said elongated member along said pipeline as it is payed overboard from said vessel.

2. A method as defined in claim 1 further comprising:
   distributing weight on said elongated member in a nonuniform distribution as a function of length of said member.

3. A method as defined in claim 2 wherein the step of distributing further comprises:
   distributing said weight in a gradually and substantially smoothly increasing weight per unit length in a direction aft of said floating vessel.

4. A method as defined in claim 1 further comprising the steps of:
   temporarily connecting said elongated member to said vessel at a point intermediate the ends of the member;
   disconnecting a portion of said member forward of the temporary connection;
   threading the disconnected portion of said member through a new segment of pipeline;
   reconnecting the disconnected portion of said member to the balance of said member;
   disconnecting the temporary connection between said member and the vessel and
   permanently interconnecting the new segment of pipeline to the segment of pipeline already payed overboard from said vessel.

5. A combination for laying submarine pipeline on the sea floor comprising:
   a floating vessel;
   means for moving the vessel along a path where a pipeline is desired;
   means for paying a pipeline overboard from said vessel in a substantially horizontal direction;
   an elongated member having nonuniform mass per unit length arranged inside said pipeline so as to continuously and progressively increase in mass per unit length as a function of distance aft of said vessel.

6. A combination as defined in claim 5 wherein said means for changing buoyancy comprises a flexible tension member connected at one end to said vessel and extending aft therefrom along the length of an inside said pipeline; and
   a plurality of weights having mass nonuniformly distributed along said tension member.

7. A combination for laying a pipeline on a submarine bottom from a floating vessel, said combination controlling bending of the pipeline between the bottom and the vessel comprising:
   an elongated weighted member positioned within the pipeline and extending from a portion of the pipeline adjacent the bottom to a portion of the pipeline near the vessel;
   means for connecting the elongated member to the vessel to effect progressive movement of the member through the pipeline as the pipeline is deployed from the vessel; and
   said elongated member having a distributed weight that gradually and substantially continuously increases in weight per unit length as a function of distance from the vessel.

8. A combination as defined in claim 7 wherein said elongated member includes a portion of discontinuous change in weight per unit length; and further comprising:
   means for flooding a portion of the pipeline between the bottom and the portion having a discontinuous change.

9. A combination as defined in claim 7 wherein said means for connecting the elongated member to the vessel includes;
   means for temporarily disconnecting a portion of said member from the vessel;
   means for stringing the disconnected portion through a length of pipe to be connected to said pipeline; and
   means for reconnecting the disconnected portion to the balance of the elongated member.

10. A combination for laying a pipeline on a submarine bottom from a floating vessel, said combination controlling bending of the pipeline between the bottom and the vessel comprising:
    an elongated weighted member positioned within the pipeline and extending from a portion of the pipeline adjacent the bottom to a portion of the pipeline near the vessel;
    means for connecting the elongated member to the vessel to effect progressive movement of the member through the pipeline as the pipeline is deployed from the vessel; and
    a portion of said elongated member having a positive buoyancy and another portion having a negative buoyancy.